(12) United States Patent
Zhong et al.

(10) Patent No.: US 10,397,056 B2
(45) Date of Patent: Aug. 27, 2019

(54) OPTIMIZED DIGITAL COMPONENT ANALYSIS SYSTEM

(71) Applicant: Google LLC, Mountain View, CA (US)

(72) Inventors: Qian Zhong, San Jose, CA (US); Aranyak Mehta, Palo Alto, CA (US); Patrick Hummel, Cupertino, CA (US); Kshipra Uday Bhawalkar, Mountain View, CA (US); Shaohua Sun, Palo Alto, CA (US); Gagan Aggarwal, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 15/382,231

(22) Filed: Dec. 16, 2016

(65) Prior Publication Data

US 2018/0176081 A1 Jun. 21, 2018

(51) Int. Cl.
*G06F 15/177* (2006.01)
*H04L 12/24* (2006.01)
(Continued)

(52) U.S. Cl.
CPC ........ *H04L 41/0823* (2013.01); *G06F 16/156* (2019.01); *G06F 16/838* (2019.01);
(Continued)

(58) Field of Classification Search
CPC ................... H04L 41/0823; H04N 1/00204
See application file for complete search history.

(56) References Cited

U.S. PATENT DOCUMENTS

| 7,415,423 B2* | 8/2008 | Ranka ............. G06Q 10/06315 705/12 |
| 2003/0149937 A1* | 8/2003 | McElfresh ............. G06Q 30/02 715/210 |

(Continued)

OTHER PUBLICATIONS

International Search Report and Written Opinion issued in International Application No. PCT/US2017/033116, dated Sep. 12, 2017, 9 pages.

(Continued)

*Primary Examiner* — Yves Dalencourt
(74) *Attorney, Agent, or Firm* — Fish & Richardson P.C.

(57) ABSTRACT

Methods, systems, and apparatus, including computer programs encoded on a computer storage medium. In some implementations, methods include determining multiple different configurations of multiple digital components eligible to be presented within a single digital component slot in a given electronic document being presented at a client device, selecting a particular configuration that has a highest configuration score and includes a given digital component, determining an offset factor that quantifies a negative impact of the given digital component on other digital components, optimizing a distribution amount applied to the given digital component based on the offset factor and a baseline distribution amount applied to each digital component in each of the multiple different configurations, and transmitting the given digital component to the client device based on the distribution amount for the given digital component, including causing the given digital component to be presented at the client device in the particular configuration.

20 Claims, 4 Drawing Sheets

(51) Int. Cl.

| | | |
|---|---|---|
| *H04N 1/00* | (2006.01) | |
| *G06F 16/9538* | (2019.01) | |
| *G06F 16/95* | (2019.01) | |
| *G06F 16/838* | (2019.01) | |
| *G06F 16/14* | (2019.01) | |
| *G06F 16/9038* | (2019.01) | |
| *G06F 16/957* | (2019.01) | |
| *G06Q 30/02* | (2012.01) | |

(52) U.S. Cl.
  CPC .......... *G06F 16/9038* (2019.01); *G06F 16/95* (2019.01); *G06F 16/9538* (2019.01); *G06F 16/9577* (2019.01); *G06Q 30/02* (2013.01); *H04N 1/00204* (2013.01); *H04L 2209/60* (2013.01)

(56) References Cited

U.S. PATENT DOCUMENTS

| | | |
|---|---|---|
| 2007/0255759 A1 | 11/2007 | Akelbein et al. |
| 2015/0006300 A1 | 1/2015 | Hummel |
| 2015/0046467 A1 | 2/2015 | Hummel |
| 2015/0051984 A1 | 2/2015 | Hummel |
| 2015/0051985 A1 | 2/2015 | Hummel |
| 2015/0112978 A1 | 4/2015 | Arora |
| 2015/0356123 A1 | 12/2015 | Gorelik |
| 2015/0379015 A1 | 12/2015 | Qiao |
| 2016/0210689 A1 | 7/2016 | Hummel |
| 2018/0260365 A1* | 9/2018 | Lagerblad ........... G06F 3/04842 |

OTHER PUBLICATIONS

AU Office Action issued in Australian Application No. 2017301075, dated Jan. 10, 2019, 2 pages.
KR Office Action issued in Korean Application No. 10-2018-7004469, dated Jan. 25, 2019, 6 pages (with English translation).
Extended European Search Report in European Appln. 17829576.2-1216, dated Apr. 5, 2019, 11 pages.
EP Office Action issued in European Appln. PCT/US2017033116, dated Apr. 25, 2019, 1 pages.

* cited by examiner

OPTIMIZED DIGITAL COMPONENT ANALYSIS SYSTEM

BACKGROUND

This specification relates to optimizing decision systems. Online networks have enabled communication between machines that are located across the globe. Digital components and content shared between these machines may be provided by multiple providers. Machine decision systems are used to select and distribute the digital components to client devices over a packet-based network or other network.

SUMMARY

In general, one innovative aspect of the subject matter described in this specification can be embodied in systems that include a digital component database that stores distribution parameters that trigger transmission of a given digital component provided by a provider, and a digital component optimization server that transmits digital components to client devices and performs operations. These operations include determining multiple different configurations of multiple digital components that are eligible to be presented within a single digital component slot in a given electronic document being presented at a client device, selecting, from among the multiple different configurations, a particular configuration that has a highest configuration score and includes a given digital component, determining an offset factor that quantifies a negative impact of the given digital component on other digital components among the multiple digital components, optimizing a distribution amount applied to the given digital component based on the offset factor and a baseline distribution amount applied to each of the multiple digital components in each of the configurations of the multiple different configurations, including increasing the distribution amount applied to the given digital component based on a magnitude of the offset factor, and transmitting, by a distribution server, the given digital component to the client device based on the distribution amount applied to the given digital component, including causing the given digital component to be presented at the client device in the particular configuration.

These and other embodiments can each optionally include one or more of the following features. Optimizing the distribution amount may include performing the following operations for each configuration of the multiple configurations: calculating, by the component optimization server, a total benefit value based on (i) eligibility values of the multiple digital components that are eligible to be presented within the single digital component slot in the configuration and (ii) placements of the multiple digital components within the single digital component slot in the configuration, calculating, by the component optimization server, a total benefit value based on (i) eligibility values of the multiple digital components that are eligible to be presented within the single digital component slot in the selected configuration and (ii) placements of the multiple digital components within the single digital component slot in the selected configuration, calculating, by the component optimization server, a difference between the total benefit value based on the configuration and the total benefit value based on the selected configuration, calculating, by the component optimization server, a maximum value of a function of (i) a weighted function of a baseline distribution amount applied to each of the digital components in the configuration, (ii) an interaction rate for each of the digital components in the configuration, and (iii) a difference between the total benefit value based on the configuration and the total benefit value based on the selected configuration, comparing, by the component optimization server, the maximum value of the function for the configuration to the maximum value of the function for each of the other multiple different configurations, and selecting, by the component optimization server and as the distribution amount, a largest value of the function over the multiple different configurations.

The weighted function of the baseline distribution amount may be weighted using the interaction rates for the digital components in the configuration.

Calculating the total benefit value based on the configuration can include summing, over each of the eligible digital components, a function of an eligibility value of the digital component and an interaction rate of the digital component in the configuration.

Calculating the total benefit value based on the selected configuration may include summing, over each of the eligible digital components, a function of an eligibility value of the digital component and an interaction rate of the digital component in the selected configuration.

Each of the multiple configurations can have a configuration score determined based on summing, over each of the multiple digital components included in the configuration, a function of an eligibility value of the digital component and an interaction rate of the digital component in the configuration.

The digital component optimization server can perform additional operations, including determining that the offset factor that quantifies a negative impact of the given digital component on other digital components among the multiple digital components is zero when the particular configuration that has the highest configuration score and includes the given digital component also provides the largest value of the function.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter discussed in this application enables a system to provide differing amounts of value to different providers of digital components by offering different configurations of the limited, finite amount of display space within the single digital component slot. For example, a distribution amount applied for presentation of a digital component at a particular position within a particular single digital component slot may be determined based on the visual attributes of the particular position (e.g., as the size of the position increases, the distribution amount increases, etc.) By adjusting distribution amounts applied and positions of particular digital components, a content provider is able to maximize the value of the presentation of the digital component and efficiently utilize the limited amount of display space.

Some content providers may discover that by offering exorbitantly large distribution amounts, they are able to force other content providers' digital components out of a configuration. Because many common digital component selection systems determine distribution amounts to apply for presentation of a digital component within a single digital component slot based on the next-highest amount (e.g., bid) received, an unscrupulous content provider may game the system by offering an artificially large distribution amount, knowing that the second-highest, and more reasonable distribution amount will be the actual amount applied for distribution of the digital component. A configuration may then be selected that discards other digital components, or that places other digital components in positions having visual attributes such as reduced size, undesirable formatting, etc. The winning configuration may prevent other content providers from competing or deriving benefits from the presentation of digital components, and may hinder proliferation of presenting digital components within a single digital component slot.

The proposed system offers an incentive to offer large distribution amounts only if the content provider offering the distribution amount has determined that the increased distribution amount applied is worth the additional value derived from presenting the digital component within the single digital component slot in a particular configuration. By incentivizing content providers to offer fair and competitive distribution amounts for the presentation of particular digital components within a particular configuration of a single digital component slot, the system closes an unintended loophole and remedies a detrimental characteristic of the present digital component selection and distribution system to make participation in the system fairer to all participants.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discloses methods, systems, and devices that are used to facilitate selection and distribution of digital components to client devices over a packet-based network or other network. As discussed in more detail below, a digital component can be selected for distribution, for example, when a configuration score for a configuration of one or more digital components within a single digital component slot that includes the digital component is greater than configuration scores for configurations of one or more digital components within the single digital component slot that don't include the digital component.

For example, assume that a search results page is being generated, and that a digital component (e.g., audio clip, video clip, image, or text in any form) has been identified as eligible to be selected for presentation in the search results page. In this example, the search results page includes a single digital component slot that is configured to display one or more digital components. In some implementations, multiple digital components can be presented in the single digital component slot. In some implementations, the number of digital components presented in the single digital component slot may differ. For example, in one configuration, two digital components can be presented within the single digital component slot, while in other configurations, one, three, fifteen, etc. digital components can be presented within the single digital component slot. In this example, the configuration selected may be based on the configuration score of the candidate configurations. For example, if the configuration in which two digital components are presented within the single digital component slot has a higher configuration score than other configurations in which one or four digital components are presented within the single digital component slot, the configuration in which two digital components are presented may be selected. In some examples, the configurations of digital components within the single digital component slot can include different placements or orders of the digital components. In some examples, the configurations of digital components within the single digital component slot can include different properties (e.g., the digital components may be different sizes, shapes, formats such as audio, video, image, or text in any form).

Note that the techniques described in this document can also be implemented in situations where a user is browsing through available applications (e.g., in an online application store or a web browser) or in other environments (e.g., on publisher web pages). For brevity, much of the description that follows will refer to the search results environment.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider). As discussed in more detail below, digital components from multiple different sources can be combined into a single electronic document (e.g., collection of various different digital components), and portions of various digital components from different sources can be combined into a single digital component with information extracted from search results (or other portions of content).

Figure 1:
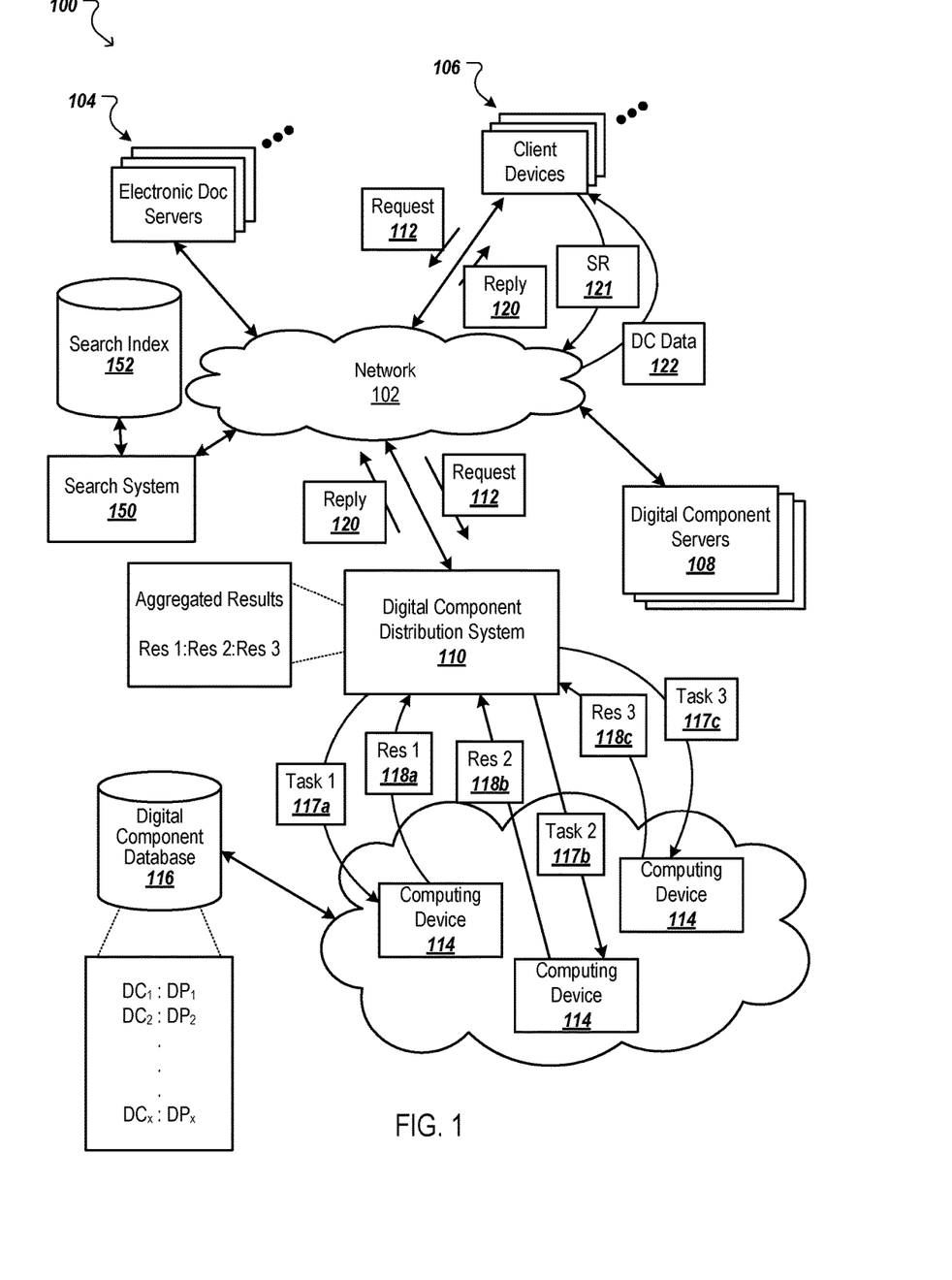
FIG. 1 is a block diagram of an example environment in which digital components are distributed for presentation with electronic documents.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, digital component servers 108, and a digital component distribution system (DCDS) 110 (also referred to as a component distribution system). The example environment 100 may include many different electronic document servers 104, client devices 106, and digital component servers 108.

A client device 106 is an electronic device that is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include one or more digital component tags or digital component scripts that reference the DCDS 110. In these situations, the digital component tags or digital component scripts are executed by the client device 106 when the given electronic document is processed by the client device 106. Execution of the digital component tags or digital component scripts configures the client device 106 to generate a request for one or more digital components 112 (referred to as a "component request"), which is transmitted over the network 102 to the DCDS 110. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the DCDS 110 can use to select one or more digital components provided in response to the request. The component request 112 is transmitted, by the client device 106, over the network 102 (e.g., a telecommunications network) to a server of the DCDS 110.

The component request 112 can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the DCDS 110. Similarly, event data specifying keywords associated with the electronic document ("document keywords") or entities (e.g., people, places, or things) that are referenced by the electronic document can also be included in the component request 112 (e.g., as payload data) and provided to the DCDS 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110 chooses digital components that will be presented with the given electronic document in response to receiving the component request 112 and/or using information included in the component request 112. In some implementations, a digital component is selected (using the techniques described herein) in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the DCDS 110 is implemented in a distributed computing system that includes, for example, a server and a set of multiple computing devices 114 that are interconnected and identify and distribute digital components in response to requests 112. The set of multiple computing devices 114 operate together to identify a set of digital components that are eligible to be presented in the electronic document from among a corpus of millions of available digital components (DC1-x). The millions of available digital components can be indexed, for example, in a digital component database 116. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. In other words, the distribution parameters are used to trigger distribution (e.g., transmission) of the digital components over the network 102. The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, bid, or some other specified value) that is used for evaluating the eligibility of the digital component for distribution/transmission (e.g., among other available digital components), as discussed in more detail below. In some situations, the eligibility value can specify an amount that will be submitted when a specific event is attributed to the digital component (e.g., when an application is installed at a client device through interaction with the digital component or otherwise attributable to presentation of the digital component).

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the DCDS 110. For example, the results 118a-118c provided by each of the computing devices in the set 114 may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The DCDS 110 aggregates the results 118a-118c received from the set of multiple computing devices 114 and uses information associated with the aggregated results to select one or more digital components that will be provided in response to the request 112. For example, the DCDS 110 can select a set of winning digital components (one or more digital components) based on the outcome of one or more component evaluation processes, as discussed below. In turn, the DCDS 110 can generate and transmit, over the network 102, reply data 120 (e.g., digital data representing a reply) that enables the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in a search results page.

A search result is data generated by the search system 150 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. In some situations, the search system 150 can be part of, or interact with, an application store (or an online portal) from which applications can be downloaded for install at a client device 106 in order to present information about downloadable applications that are relevant to a submitted search query. Like other electronic documents, search results pages can include one or more digital component slots in which digital components (e.g., video clips, audio clips, images, or other digital components that can be formatted as advertisements) can be presented.

In some implementations, the DCDS 110 may determine how many digital components to provide for presentation with a given electronic document based on an analysis of the eligible digital components. For example, even where multiple different digital components have been requested for presentation with the given electronic document (e.g., in a single digital component slot or multiple different digital component slots), the DCDS 110 may decide to provide fewer than the number of digital components requested based on the analysis. The analysis may also decide to provide no digital components in response to a request or the full number of digital components requested based on the analysis technique discussed below.

The analysis techniques described below can consider, for example, a position within a single digital component slot at which digital components will be presented, formatting that can be dynamically applied to each of the digital components (e.g., each of which changes properties of the digital components, including size), and various other factors to arrive at an evaluation score that is used to determine which digital components (if any) will be presented with the electronic document. Further, as described in detail with reference to FIG. 2, the DCDS 110 can compute a distribution amount (e.g., a payment) that is applied (e.g., to a provider of the digital component) for presentation of (or interaction with) each of the digital components that are presented with the electronic document.

The DCDS 110 can be implemented to address problems that can arise in the context of selecting the digital components that will be presented. For example, due to the nature of how existing selection processes work, it is possible for a particular digital component provider to have their digital component presented and block the presentation of other digital components provided by other digital component providers without being assessed for the negative effect on the other digital component providers (e.g., the loss of the opportunity to have their digital components presented). The techniques discussed below address this problem through an optimization of digital component selection techniques and distribution amounts. For example, the optimization results in a selection technique that applies an offset factor to a distribution amount applied to a particular digital component to account for the negative impact that selection of the digital component has on other digital components that were precluded from presentation. As such, the optimized selection techniques reduce the likelihood that digital component providers will attempt to game the system because the modifications to the selection techniques reduce the ability of a digital component provider to gain from such activity.

Figure 2:
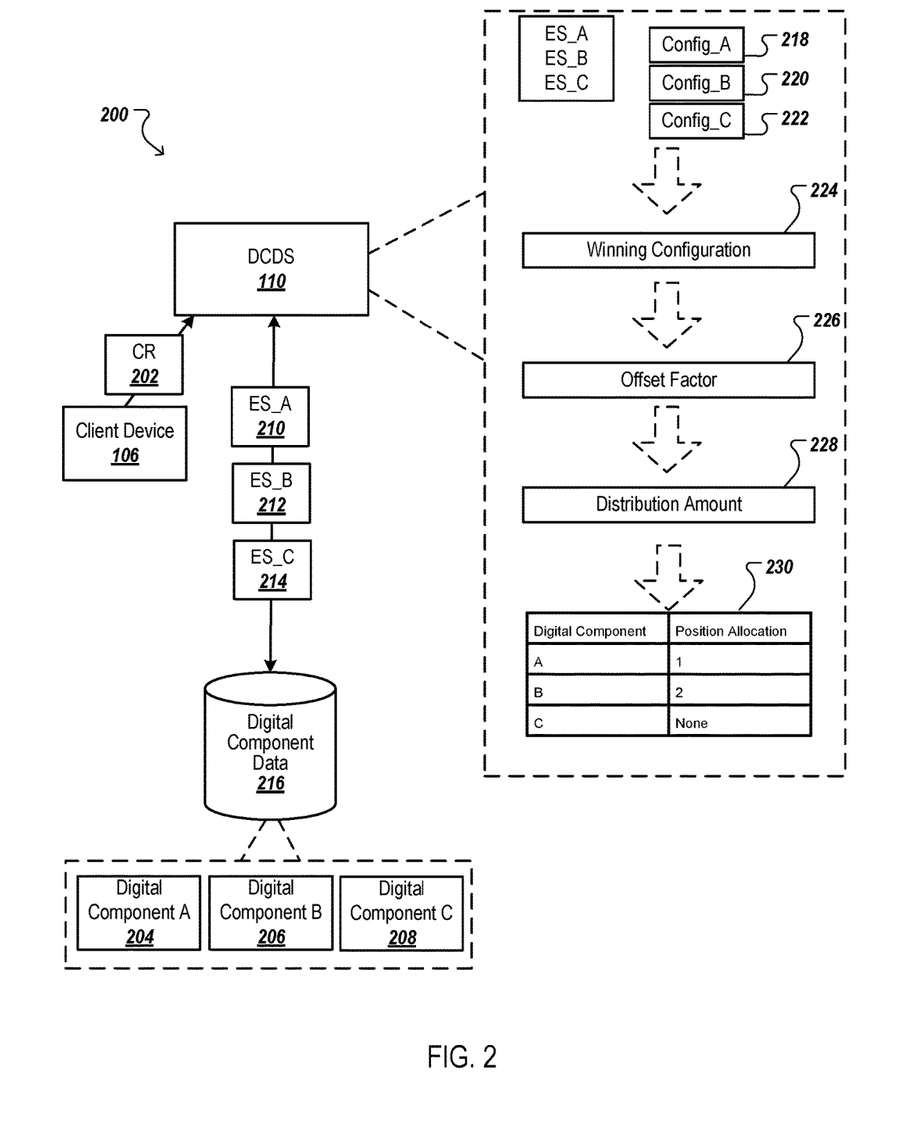
FIG. 2 is an example data flow for selecting and distributing digital components to client devices over a packet-based network or other network.

FIG. 2 is an example data flow 200 for optimizing digital component analysis and distribution. The data flow 200 can begin with the DCDS 110 receiving a component request ("CR") 202 from a client device 106. As noted above, the component request 202 can include information that facilitates analysis of digital components and automated decisions as to which digital components are provided in response to the component request 202. For example, the component request 202 can include data (e.g., keywords or phrases) specifying one or more characteristics that are related to an electronic document with which the requested digital components will be presented.

The component request 202 can also specify a maximum number of digital components that are able to be presented in presentation positions of the electronic document. For example, for the purposes of the following discussion, we can assume that the component request 202 specifies that a maximum of three digital components can be presented in presentation positions of the electronic document. The presentation positions can be positions within a single digital component slot of the electronic document (e.g., position 1, position 2, and position 3). In this example, a maximum of three digital components can be selected for presentation in response to the component request 202.

Fewer than three digital components can also be selected for presentation in response to the component request 202. When fewer than three digital components are selected for presentation, one or more of the digital components that are selected for presentation can be resized so that the space that would have been occupied by other digital components will be occupied by the resized digital components. More specifically, the digital component slot can have a fixed size (e.g., as specified in HTML code of a page or a script embedded in the page), and the digital components that are selected for presentation in the digital component slot can be resized and or reconfigured to fully occupy the digital component slot irrespective of how many digital components are selected for presentation in the digital component slot. The digital components that are selected for presentation may be enhanced by extensions or formats such as location extensions, third-party reviews, consumer and seller ratings, site links, descriptive snippets and text, and previous visits. For example, a digital component may be formatted to include a photo of a user's current location determined using a location extension.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Based at least in part on the information included in the component request 202, the DCDS 110 identifies eligible digital components that are eligible to be provided in response to the component request 202. For example, the DCDS 110 can use keywords or other information specified by (or related to) the component request 202 (e.g., geographic information or time of day information) to identify eligible digital components (e.g., digital components having distribution parameters that are matched by the information included in the component request 202). In the present example, assume that Digital Component A 204, Digital Component B 206, and Digital Component C 208 are eligible to be provided for presentation in response to the component request 202.

The DCDS 110 obtains evaluation scores that have been specified for the respective eligible digital components. Evaluation scores are quantities that are used to evaluate and/or rank digital components for purposes of determining which digital components will be distributed to client devices. For example, a digital component having a highest evaluation score (e.g., among other eligible digital components) will generally be selected for distribution in response to a request over another digital component having a lower evaluation score. In some implementations, the evaluation score for each digital component can be an amount (e.g., a bid, or other specified value) that is submitted by a provider of the digital component. For example, the evaluation score can be based on the eligibility value of the digital component. In some implementations, the evaluation score can be a function of the amount submitted by the provider and some other factor (e.g., a quality factor, performance factor, or other factor) that is used to adjust the amount that is submitted by the provider of the digital component.

The evaluation scores can be obtained, for example, from a digital component data store 216 that stores digital component data, such as digital components (or information identifying digital components), evaluation scores for the digital components, distribution parameters for the digital components, and configurations for particular digital component slots.

In the present example, assume that ES_A 210 is obtained for Digital Component A 204, ES_B 212 is obtained for Digital Component B 206, and ES_C 214 is obtained for Digital Component C 208, and that the evaluation scores are obtained from the data store 216. The DCDS 110 selects multiple different digital components that are eligible for presentation based on the evaluation scores.

The DCDS 110 obtains configurations, for the single digital component slot, that have been specified for the respective eligible digital components. Configurations specify a position within the single digital component slot for each eligible digital component, and can specify visual attributes of the eligible digital attribute (e.g., size, shape, color, extensions, formats, etc.) For example, a configuration can specify that two digital components are to be displayed within the single digital component slot, and that one digital component is to be twice the size of the other digital component. Configurations may include fewer than all of the eligible digital components. For example, four digital components may be eligible for display within the single digital component slot, but a configuration may specify that only two of the components are displayed within the single digital component slot, and that the components are to be the same size. Valid configurations may be determined based on evaluation scores for the digital components. For example, valid configurations may include only digital components with evaluation scores that meet a threshold value.

In the present example, assume that Config A 218 includes Digital Component A 204, Digital Component B 206, and Digital Component C 208. Each of the digital components is the same size, and the digital components fill the single digital component slot. Assume that Config B 220 includes Digital Component A 204 and Digital Component B 206, that Digital Component A 204 is larger than Digital Component B 206, and that the digital components fill the single digital component slot. Assume that Config C 222 includes Digital Component A 204, and that Digital Component A 204 is the size of the single digital component slot.

The DCDS 110 can obtain configurations 218, 220, and 222, for example, from a digital component data store 216 that stores digital component data, such as digital components (or information identifying digital components), evaluation scores for the digital components, distribution parameters for the digital components, and configurations for particular digital component slots.

In some examples, the DCDS 110 can identify various different configurations for the multiple selected digital components (e.g., based on information in the request, size of slot, number of digital components selected, and/or formatting that can be applied to the digital components). For example, the DCDS 110 can use the evaluation scores 210, 212, and 214 to generate configurations for the multiple selected eligible digital components.

The configurations can specify positions for digital components within a single digital component slot. For example, multiple digital components may be presented within a single digital component slot. Each of the digital components may be assigned a position within the single digital component slot. In some implementations, the positions adjust visual attributes of digital components within the position. For example, a particular position may be larger than other positions within the same single digital component slot, thereby causing dimensions of the digital components to be adjusted to fit the particular position. In some implementations, a particular position may specify a type of digital component that is eligible. For example, within a single digital component slot, there may be one position that requires a text digital component while another position requires a large video clip. As such, the types of content presented in each position may be restricted to a particular content type.

The DCDS selects one of the configurations 224 from among the available configurations 218, 220, and 222. In some implementations, the configuration that is selected has a highest configuration score. The configuration score for each configuration can be determined using the total benefit that is attributed to each digital component in the configuration. For example, the configuration score for a particular configuration can be a sum of the benefit provided to each of the digital components that are included (e.g., presented) in that particular configuration, as represented in relationship (1).

$$CS(A) = \sum_{i=1}^{n} EV_i(A) * IR_i(A) \qquad (1)$$

where,

CS(A) is the configuration score for configuration A;

$EV_i(A)$ is the eligibility value for digital component i in configuration A;

$IR_i(A)$ is the interaction rate for the digital component i in configuration A; and n is a total number of digital components presented in configuration A.

The configuration having the highest configuration score can be referred to as the winning configuration W, which will be used to present a set of digital components.

In standard digital component selection and presentation procedures, a distribution amount is applied to digital component providers for presentation of digital components. A baseline distribution amount (BDA) to be applied for presentation of a digital component in a particular configuration of a single digital component slot is obtained for each configuration A.

In some implementations, the BDA applied to a digital component provider is based on the next-highest eligibility value of the candidate digital components during the digital component selection and presentation procedure as well as the extensions or formats available to the digital component provider in configuration A. However, the BDA does not take into account the detriment to other digital components from the winning configuration. In some implementations, the winning configuration has the highest configuration score. The configuration score of a configuration may be based on the highest eligibility value of candidate digital components for the configuration. In some implementations, a digital component provider may submit an artificially high eligibility value in order to force the DCDS 110 to select a configuration in which a digital component provided by the digital component provider is the only digital component presented within the single digital component slot.

In such implementations, if the BDA applied to the digital component provider is determined based on the next-highest eligibility value of the candidate digital components, and the eligibility value that the digital component provider submitted is artificially high, the digital component provider may receive significant benefits at significant detriment to other digital component providers. For example, a winning configuration may only present three out of four candidate digital components within the single digital component slot. In this example, the winning configuration excludes the fourth candidate digital component, depriving the provider of the excluded candidate digital component of the benefit that the fourth candidate digital component would have received if it had been presented in the single digital component slot. Additionally, the candidate digital components that are selected for presentation in the single digital component slot but are presented in lower positions within the single digital component slot than the winning digital component will lose a certain amount of benefit from not being presented in the first position.

For example, the first position within the single digital component slot may be half of the size of the single digital component slot. In this example, the second position within the single digital component slot and the third position within the single digital component slot may be the same size, and may each be a quarter of the size of the single digital component slot. In this example, the digital components presented within the second and third positions may not be as large as the digital component presented within the first position of the single digital component slot, and may not receive as much benefit as they would if the digital component presented within the first position of the single digital component slot had not been presented with half of the size of the single digital component slot.

In some implementations, the detriment that is attributed to a given digital component being presented in a particular position within the single digital component slot can be quantified, for example, by comparing a total benefit (e.g., positive value) that other digital components would have received in an alternative configuration to a total benefit that other digital components received in the winning configuration.

For each particular digital component that will be presented in the winning configuration, the DCDS 110 calculates the total benefit that other digital components would have received in an alternative configuration. The total benefit can be determined using the eligibility values that were provided for each of the other digital components. For example, the benefit to each of the other digital components can be determined as a product (or another mathematical function) of the eligibility value (e.g., bid) for the digital component and an interaction rate for the digital component (e.g., a click-through rate or other measure of user interaction with the digital component). In some implementations, the interaction rate is specified on a per-format basis, such that the benefit determined for the digital component will account for the effect of the formats applied to the digital component within the configuration.

The interaction rates can specify (or be based on) one or more various different measures of interaction, including CTR (click-through rate), conversion rate, time spent on a subsequent landing page, etc. In some implementations, a predicted interaction rate is supplied by a machine learning model that outputs predicted interaction rates based on event data corresponding to a particular presentation opportunity. The machine learning model can be any of a variety of models such as decision trees, linear regression, neural networks, Bayesian networks, etc., and can be trained using a variety of approaches, such as deep learning, inductive logic, support vector machines, clustering, etc. In some implementations, input to the machine learning model includes parameters such as position on a page, formats applied, search phrase used, mobile or desktop format, the digital component itself, etc.

The machine learning model can calculate an aggregated probability of interaction using the input parameters, and this aggregated probability can be used in place of the interaction rates in determining a benefit provided to other digital components when the given digital component is not included in each configuration.

For example, relationship (2) can be used to determine the benefit provided to other digital components when the given digital component is not included in each configuration.

$$B_{-i}(A) = \sum_{x \neq i} EV_x(A) * IR_x(A) \tag{2}$$

where, $B_{-i}(A)$ is the benefit provided to other digital components besides the digital component i in the configuration A;

$EV_x(A)$ is the eligibility value for the digital component x in configuration A; and $IR_x(A)$ is the interaction rate of the digital component x for the configuration A.

The DCDS 110 can use relationship (2) to determine the total benefit provided to the other digital components in each available configuration, including the winning configuration (e.g., where A=W).

Using the total benefit calculated from the relationship (2), the DCDS 110 determines the detriment that is attributed to a given digital component being presented in a particular position within the single digital component slot. This detriment can be represented by an offset factor 226. The offset factor 226 for a given digital component quantifies or accounts for a negative impact that inclusion of the given digital component in a given configuration has on other digital components.

For example, relationship (3) can be used to determine an offset factor 226 for a given digital component being presented in a particular position within the single digital component slot by comparing a total benefit that other digital components would have received in an alternative configuration to a total benefit that other digital components received in the winning configuration.

$$B_{-i}(A) - B_{-i}(W) \tag{3}$$

where, $B_{-i}(A)$ is the benefit provided to other digital components besides the digital component i in the configuration A; and $B_{-i}(W)$ is the benefit provided to other digital components besides the digital component i in the winning configuration W.

In the present example, consider that the offset factor 226 represents a difference between a benefit provided to other components of the other digital components in the particular configuration A and a benefit provided to the other digital components in the winning configuration W 224.

If the offset factor 226 indicates that the detriment to other digital components is negligible or nonexistent, the BDA is the amount applied for presentation of a digital component in a particular configuration of a single digital component slot. For example, if the BDA provides enough incentive for content providers to offer reasonable distribution amounts and to avoid offering artificially high distribution amounts in order to exclude competitors, the BDA is the amount applied.

In some implementations, in order to account for the detriment to other digital components that is attributed to a given digital component being presented in a particular position within the single digital component slot when determining a distribution amount to be applied to a provider of the given digital component, the DCDS 110 maximizes a function of calculated terms to optimize a distribution amount for a particular digital component. For example, relationship (4) can be used to optimize the distribution amount.

$$\frac{B_{-i}(A) - B_{-i}(W) + BDA_i(A) * IR_i(A)}{IR_i(W)} \quad (4)$$

where, $BDA_i(A)$ is the baseline distribution amount that is charged for the presentation of the digital component i in configuration A;

$B_{-i}(A)$ is the benefit provided to other digital components besides the digital component i in the configuration A;

$B_{-i}(W)$ is the benefit provided to other digital components besides the digital component i in the winning configuration W;

$IR_i(A)$ is the interaction rate of the digital component i for the configuration A; and $IR_i(W)$ is the interaction rate of the digital component i for the winning configuration W.

The DCDS 110 may optimize relationship (4) over different configurations. As shown in relationship (4), the distribution amount determined accounts for the offset factor 226, and therefore the detriment attributed to a given digital component i being presented in a particular position within the single digital component slot. Additionally, it is apparent that when the given configuration A is the winning configuration W, the offset factor 226 is zero, and the interaction rates of the particular digital components cancel, and therefore the distribution amount charged is the BDA.

In the present example, assume that Config_B 220 is selected to be the winning configuration W 224. In some implementations, the different configurations include the winning configuration 224. In some implementations, the different configurations A do not include the winning configuration 224. In the present example, assume that the different configurations include the winning configuration 224, or Config_B 220.

For each of the candidate digital components in a given configuration, the DCDS 110 can determine an offset factor 226 to be used in the optimization of a distribution amount for the digital components to be distributed. The offset factor 226 quantifies a negative impact of a given digital component on other digital components among the eligible digital components used in the particular configuration. For example, the offset factor 226 can quantify a total interaction rate lost by the other digital components due to the given digital component forcing a change in configuration. In the present example, consider that the winning configuration 224 includes Digital Component A 204 and Digital Component B 206, while Digital Component C 208 is not presented in the single digital component slot. Additionally, Digital Component A 204 is formatted to be larger than Digital Component B 206. An offset factor 226 determined by the DCDS 110 for Digital Component A 204 in the winning configuration 224 can quantify a total interaction rate lost by the other digital components (Digital Component B 206 and Digital Component C 208).

The DCDS 110 then determines a distribution amount 228 for presentation of the digital components within the single digital component slot based on the offset factor 226. In some implementations, the distribution amount 228 is determined based on a magnitude of the determined offset factor 226. For example, the DCDS 110 can determine a distribution amount 228 by evaluating the relationship (4) at its maximum value. In the present example, the DCDS 110 determines a distribution amount 228 for presentation of the digital components in a particular configuration by maximizing the relationship (4). In some implementations, the DCDS 110 optimizes relationship (4) over all eligible digital components for all configurations A. For example, the DCDS 110 may optimize the configuration A over Digital Component A 204, Digital Component B 206, and Digital Component C 208 even though Digital Component C 208 is not included in the winning configuration 224.

Upon determining the distribution amount 228, the DCDS 110 allocates positions 230 for the digital components selected to be presented in the single digital component slot in the winning configuration 224. In the present example, Digital Component A 204 is selected for position 1, Digital Component B 206 is selected for position 2, and Digital Component C is not selected to be presented within the single digital component slot.

The DCDS 110 can then transmit the digital components and the configuration 230 of the digital components over a network (e.g., the network 102) to be presented at a client device (e.g., the client device 106). The DCDS 110 applies the determined distribution amount 228 for presentation of the digital components in the configuration 230.

In the present example, consider that an ideal distribution amount to be applied to a given digital component is exactly the offset factor 226 more than the baseline amount when comparing a given configuration in which there are two digital components to be displayed to a configuration in which there are three digital components to be displayed. By applying a larger distribution amount to the given digital component, the content provider is only incentivized to offer a distribution amount that forces the selection of the configuration in which there are two digital components to be displayed when the value that the content provider places on the incremental additional interactions the content provider would receive in the configuration in which there are two digital components to be displayed is greater than the value of the incremental additional interactions the content providers of the other digital components that would be displayed in the two configurations would receive.

The proposed system provides the discussed incentive by applying a BDA to interactions that the given digital component would have received in the other configurations and by applying a distribution amount determined based on the offset factor to the incremental additional interactions the given digital component receives in the winning configuration in which there are two digital components to be displayed.

The determined distribution amount 228 based on the offset factor 226 creates a situation in which content providers can experiment with distribution amounts to offer so that the content providers can each control when it is valuable to them to offer a larger distribution amount in order to maximize the value of the presentation of their digital component. For example, the process used by the DCDS 110 to determine the distribution amount allows content providers to determine when it is worth the additional cost determined based on the offset factor 226 to affect the positioning and display of other digital components.

There is a limited, finite amount of display space within the single digital component slot, and thus the different configurations available provide different value for each provider of a digital component selected to be presented within the particular configuration. For example, a distribution amount applied for presentation of a digital component at a particular position within a particular single digital component slot may be determined based on the visual attributes of the particular position (e.g., as the size of the position increases, the distribution amount increases, etc.) By adjusting distribution amounts applied and positions of particular digital components, a content provider is able to maximize the value of the presentation of the digital component and efficiently utilize the limited amount of display space.

In some implementations, content providers may discover that by offering exorbitantly large distribution amounts, they are able to force other content providers' digital components out of a configuration. Many common digital component selection systems determine distribution amounts to apply for presentation of a digital component within a single digital component slot based on the next-highest amount (e.g., bid) received. For example, a digital component selection system may use generalized second-price auction techniques, in which the provider that offers the highest distribution amount receives the first slot, but the second-highest distribution amount is the amount applied to the provider of the digital component placed in the first slot. In this situation, an unscrupulous content provider may game the system by offering an artificially large distribution amount, knowing that the second-highest, and more reasonable distribution amount will be the actual amount applied for distribution of the digital component. A configuration may then be selected that discards other digital components, or that places other digital components in positions having visual attributes such as reduced size, undesirable formatting, etc. The winning configuration may prevent other content providers from competing or deriving benefits from the presentation of digital components, and may hinder proliferation of presenting digital components within a single digital component slot.

The proposed system offers an incentive to offer large distribution amounts only if the content provider offering the distribution amount has determined that the increased distribution amount applied is worth the additional value derived from presenting the digital component within the single digital component slot in a particular configuration. By incentivizing content providers to offer fair and competitive distribution amounts for the presentation of particular digital components within a particular configuration of a single digital component slot, the system closes an unintended loophole and remedies a detrimental characteristic of the present digital component selection and distribution system to make participation in the system fairer to all participants. Additionally, the system combines parameters to determine a distribution amount by creating a function of the total value of the other digital components that would be displayed in a different configuration, a baseline amount that would be applied to the given digital component in the different configuration, and a BDA that would be applied to the given digital component in the winning configuration.

Figure 3:
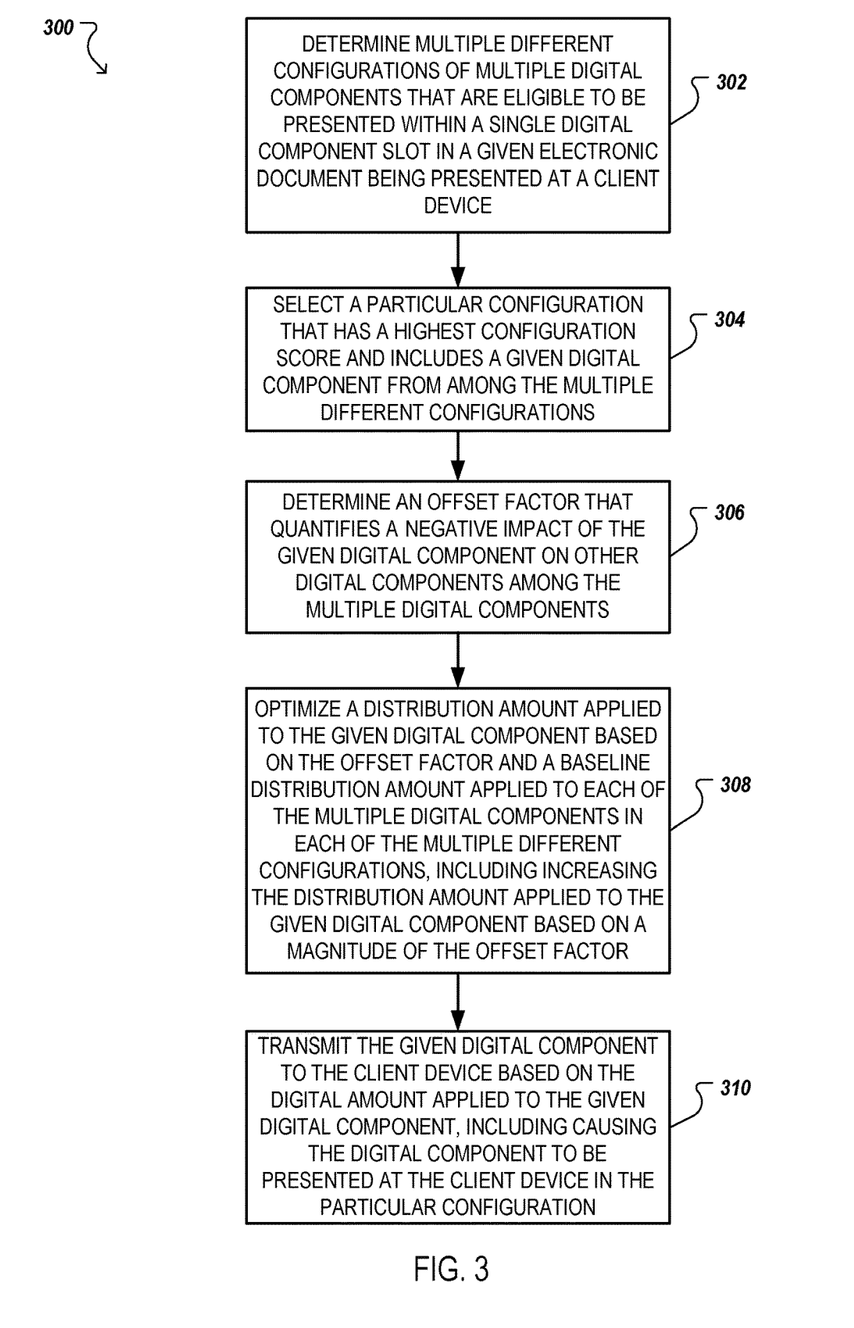
FIG. 3 is a flow chart of an example process for selecting and distributing digital components to client devices over a packet-based network or other network.

FIG. 3 is a flow chart of an example process 300 for selecting and distributing digital components to client devices over a packet-based network or other network. In some implementations, the process 300 can be implemented by one or more servers. For example, the process 300 can be implemented by the DCDS 110 of FIG. 1. In some implementations, the process 300 can be implemented as instructions stored on a non-transitory computer readable medium, and when the instructions are executed by one or more servers, the instructions can cause the one or more servers to perform operations of the process 300.

Multiple different configurations of multiple digital components that are eligible to be presented within a single digital component slot in a given electronic document being presented at a client device are determined (302). In some implementations, the DCDS 110 receives a component request that specifies a maximum number of digital components that are capable of being presented on a particular electronic document being rendered at a client device. For example, as discussed above with reference to FIG. 1, when the particular electronic document is being rendered at the client device, a script in the particular electronic document can cause the client device to initiate a component request that is transmitted to a remote server, and requests that the remote server identify and/or provide one or more digital components that the client device will integrate into the visual presentation of the particular electronic document being rendered. As discussed above, the client device can include various event data in the component request, and can include information specifying the maximum number of digital components that are capable of being presented on the particular electronic document. The component request can also specify the client device that is rendering the particular electronic document so that the remote server can respond to the request with the requested digital components or a location (e.g., URL or server location) from which the client device can obtain the requested digital components (e.g., using a redirect instruction that includes a location of another server that provides the requested digital components).

A particular configuration that has a highest configuration score and includes a given digital component is selected from among the multiple different configurations (304). In some implementations, the configuration score is determined based on the eligibility values of the digital components identified as eligible to be included in each of the configurations. For example, as discussed above, the provider (or source) of the digital component can receive a message requesting that the provider submit the current eligibility value for a current presentation opportunity. The message can include, for example, information specifying details of the presentation opportunity (e.g., an opportunity to present content at a user device). For example, the message can include any of the event data that was included in a request for content corresponding to the presentation opportunity. In response to the message, the provider can submit a current eligibility value, and this current eligibility value (or an evaluation score determined using the eligibility value) can be used to evaluate whether the given digital component will be eligible to be included in a configuration of a single digital component slot through which digital components are distributed to the client device for presentation. Alternately, the current eligibility value can be pre-specified (e.g., prior to receipt of a component request identifying the presentation opportunity), stored in a data store as described above, and obtained from the data store when a component request is received.

An offset factor that quantifies a negative impact of the given digital component on other digital components among the multiple digital components is determined (306). As described above, the offset factor can be calculated based on the total benefits for the other digital components for a given configuration and the winning configuration.

In some implementations, the distribution amount can be optimized through a series of calculations that are performed for each configuration among the multiple configurations. For example, a total benefit value can be determined based on (i) eligibility values of the multiple digital components that are eligible to be presented within the single digital component slot in the configuration and (ii) placements of the multiple digital components within the single digital component slot in the configuration. In some examples, a separate total benefit value can be determined based on (i) eligibility values of the multiple digital components that are eligible to be presented within the single digital component slot in the winning, or selected, configuration, such as the winning configuration W, and (ii) placements of the multiple digital components within the single digital component slot in the selected configuration. For example, the total benefit values based on the configuration of the multiple configurations and the total benefit value based on the selected configuration can all be determined using relationship (2). In some examples, a difference between the total benefit value determined using the configuration and the separate total benefit value using the selected configuration is determined. For example, the difference between the total benefit values can be determined using relationship (3). In some examples, a maximum value of a function of (i) a weighted function of a baseline distribution amount applied to each of the digital components in the configuration, (ii) an interaction rate for each of the digital components in the configuration, and (iii) a difference between the total benefit value based on the configuration and the total benefit value based on the selected configuration can be calculated using the results of the previously performed calculations. For example, the function for which the maximum value is found can be represented by relationship (4). In some examples, the maximum value of the function for the configuration can be compared to the maximum value of the function for each of the other multiple different configurations. In some examples, the largest value of the function over the multiple different configurations, determined based on the comparing, is selected as the distribution amount.

In some implementations, the total benefit value can be determined based on each configuration among the multiple configurations by summing, over each of the eligible digital components, a function of an eligibility value of the digital component and an interaction rate of the digital component in the configuration. In some implementations, the winning configuration W is included in the set of configurations among the multiple configurations for which the calculations are performed. For example, the total benefit value can be determined using relationship (2).

In some implementations, each of the multiple configurations has a configuration score, such as CS(A) for a configuration A, that is determined based on summing, over each of the multiple digital components included in the configuration, a function of an eligibility value of the digital component and an interaction rate of the digital component in the configuration. For example, the configuration score for a configuration of the multiple configurations can be determined using relationship (1).

In some implementations, the distribution amount applied can be optimized by optimizing a weighted function of the baseline distribution amount. For example, the baseline distribution amount can be weighted using the interaction rates for each configuration among the multiple configurations. The weighted function of the baseline distribution amount may be represented by relationship (4).

In some implementations, the offset factor is set to zero when the particular configuration that has the highest configuration score and includes the given digital component also provides the largest value of the function.

A distribution amount applied to the given digital component based on the offset factor is optimized, and increases the distribution amount applied to the given digital component based on a magnitude of the offset factor (308). In some implementations, the distribution amount determined is found by maximizing a function of the offset factor and a baseline amount to be applied to the given digital component. For example, the relationship (4) represents a function that can be used to determine the distribution amount.

The given digital component is transmitted to the client device based on the distribution amount applied to the given digital component and causes the given digital component to be presented at the client device in the particular configuration (310). The configuration in which the given digital component is transmitted can include formatting information, such as a size of the given digital component, the position of the digital component within the single digital component slot, etc.

Figure 4:
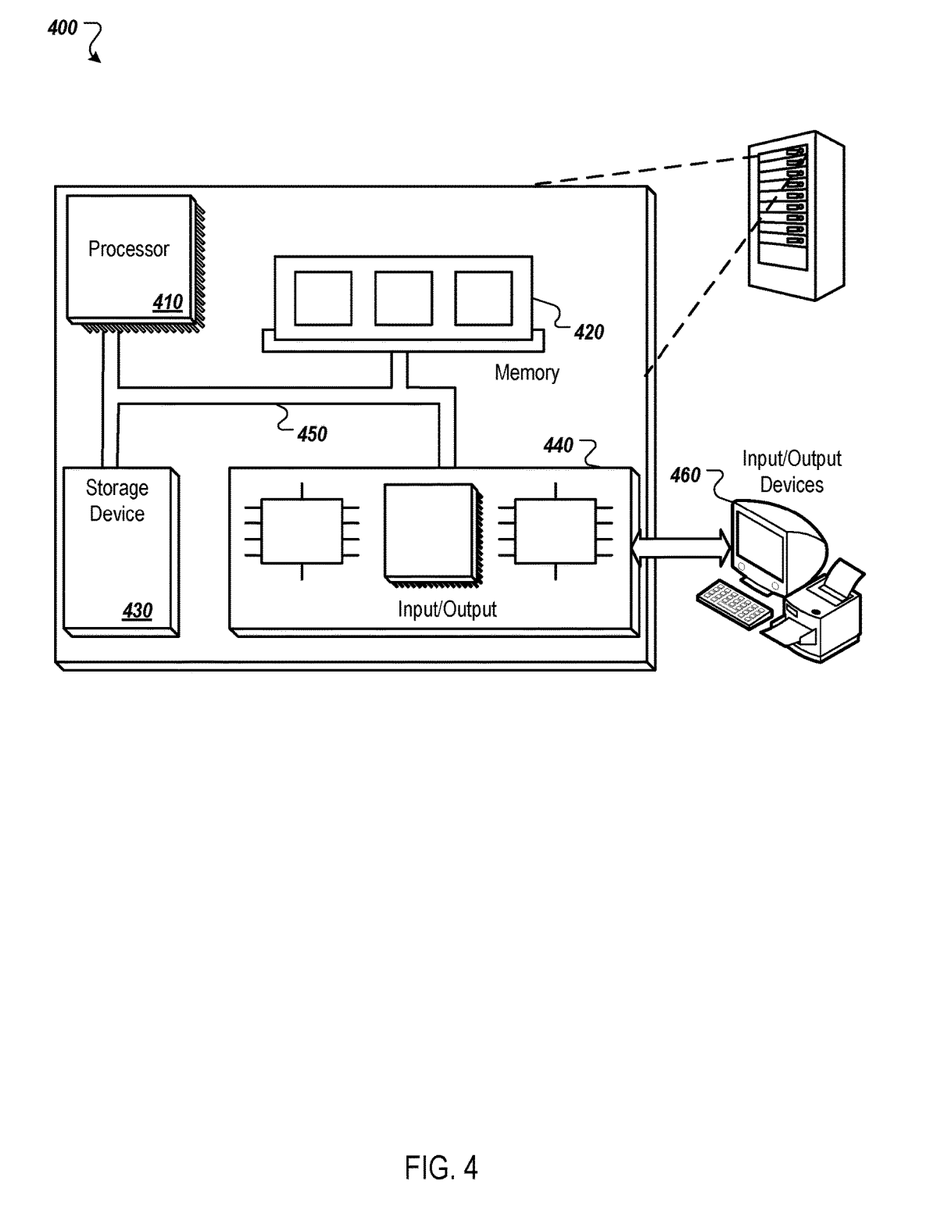
FIG. 4 is a block diagram of an example computing system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a digital component database that stores distribution parameters that trigger transmission of a given digital component provided by a provider;
   a digital component optimization server that transmits digital components to client devices and performs operations including:
   determining multiple different configurations of multiple digital components that are eligible to be presented within a single digital component slot in a given electronic document being presented at a client device;
   selecting, from among the multiple different configurations, a particular configuration that has a highest configuration score and includes a given digital component;
   determining an offset factor that quantifies a negative impact of the given digital component on other digital components among the multiple digital components;
   optimizing a distribution amount applied to the given digital component based on the offset factor and a baseline distribution amount applied to each of the multiple digital components in each of the configurations of the multiple different configurations, including increasing the distribution amount applied to the given digital component based on a magnitude of the offset factor; and
   transmitting, by a distribution server, the given digital component to the client device based on the distribution amount applied to the given digital component, including causing the given digital component to be presented at the client device in the particular configuration.

2. The system of claim 1, wherein optimizing the distribution amount comprises:
   for each configuration of the multiple configurations:
   calculating, by the digital component optimization server, a total benefit value based on (i) eligibility values of the multiple digital components that are eligible to be presented within the single digital component slot in the configuration and (ii) placements of the multiple digital components within the single digital component slot in the configuration;
   calculating, by the digital component optimization server, a total benefit value based on (i) eligibility values of the multiple digital components that are eligible to be presented within the single digital component slot in the selected configuration and (ii) placements of the multiple digital components within the single digital component slot in the selected configuration;
   calculating, by the digital component optimization server, a difference between the total benefit value based on the configuration and the total benefit value based on the selected configuration;
   calculating, by the digital component optimization server, a maximum value of a function of (i) a weighted function of a baseline distribution amount applied to each of the digital components in the configuration, (ii) an interaction rate for each of the digital components in the configuration, and (iii) a difference between the total benefit value based on the configuration and the total benefit value based on the selected configuration;

comparing, by the digital component optimization server, the maximum value of the function for the configuration to the maximum value of the function for each of the other multiple different configurations; and selecting, by the digital component optimization server and as the distribution amount, a largest value of the function over the multiple different configurations.

3. The system of claim 2, wherein the weighted function of the baseline distribution amount is weighted using the interaction rates for the digital components in the configuration.

4. The system of claim 2, wherein calculating the total benefit value based on the configuration comprises summing, over each of the eligible digital components, a function of an eligibility value of the digital component and an interaction rate of the digital component in the configuration.

5. The system of claim 2, wherein calculating the total benefit value based on the selected configuration comprises summing, over each of the eligible digital components, a function of an eligibility value of the digital component and an interaction rate of the digital component in the selected configuration.

6. The system of claim 2, wherein each of the multiple configurations has a configuration score determined based on summing, over each of the multiple digital components included in the configuration, a function of an eligibility value of the digital component and an interaction rate of the digital component in the configuration.

7. The system of claim 2, wherein the digital component optimization server performs operations further comprising determining, by the component optimization server, that the offset factor that quantifies a negative impact of the given digital component on other digital components among the multiple digital components is zero when the particular configuration that has the highest configuration score and includes the given digital component also provides the largest value of the function.

8. A method comprising:
determining, by a component optimization server, multiple different configurations of multiple digital components that are eligible to be presented within a single digital component slot in a given electronic document being presented at a client device;
selecting, by the component optimization server and from among the multiple different configurations, a particular configuration that has a highest configuration score and includes a given digital component;
determining, by the component optimization server, an offset factor that quantifies a negative impact of the given digital component on other digital components among the multiple digital components;
optimizing, by the component optimization server, a distribution amount applied to the given digital component based on the offset factor and a baseline distribution amount applied to each of the multiple digital components in each of the configurations of the multiple different configurations, including increasing the distribution amount applied to the given digital component based on a magnitude of the offset factor; and
transmitting, by a distribution server, the given digital component to the client device based on the distribution amount applied to the given digital component, including causing the given digital component to be presented at the client device in the particular configuration.

9. The method of claim 8, wherein optimizing the distribution amount comprises: for each configuration of the multiple configurations:
calculating, by the component optimization server, a total benefit value based on (i) eligibility values of the multiple digital components that are eligible to be presented within the single digital component slot in the configuration and (ii) placements of the multiple digital components within the single digital component slot in the configuration;
calculating, by the component optimization server, a total benefit value based on (i) eligibility values of the multiple digital components that are eligible to be presented within the single digital component slot in the selected configuration and (ii) placements of the multiple digital components within the single digital component slot in the selected configuration;
calculating, by the component optimization server, a difference between the total benefit value based on the configuration and the total benefit value based on the selected configuration;
calculating, by the component optimization server, a maximum value of a function of (i) a weighted function of a baseline distribution amount applied to each of the digital components in the configuration, (ii) an interaction rate for each of the digital components in the configuration, and (iii) a difference between the total benefit value based on the configuration and the total benefit value based on the selected configuration;
comparing, by the component optimization server, the maximum value of the function for the configuration to the maximum value of the function for each of the other multiple different configurations; and
selecting, by the component optimization server and as the distribution amount, a largest value of the function over the multiple different configurations.

10. The method of claim 9, wherein the weighted function of the baseline distribution amount is weighted using the interaction rates for the given digital component in the configuration.

11. The method of claim 9, wherein calculating the total benefit value based on the configuration comprises summing, over each of the eligible digital components, a function of an eligibility value of the digital component and an interaction rate of the digital component in the configuration.

12. The method of claim 9, wherein calculating the total benefit value based on the selected configuration comprises summing, over each of the eligible digital components, a function of an eligibility value of the digital component and an interaction rate of the digital component in the selected configuration.

13. The method of claim 9, wherein each of the multiple configurations has a configuration score determined based on summing, over each of the multiple digital components included in the configuration, a function of an eligibility value of the digital component and an interaction rate of the digital component in the configuration.

14. The method of claim 9, further comprising determining, by the component optimization server, that the offset factor that quantifies a negative impact of the given digital component on other digital components among the multiple digital components is zero when the particular configuration that has the highest configuration score and includes the given digital component also provides the largest value of the function.

15. A non-transitory computer readable medium storing instructions that when executed by one or more computing devices, cause the one or more computing devices to perform operations comprising:

determining, by a component optimization server, multiple different configurations of multiple digital components that are eligible to be presented within a single digital component slot in a given electronic document being presented at a client device;

selecting, by the component optimization server, from among the multiple different configurations, a particular configuration that has a highest configuration score and includes a given digital component;

determining, by the component optimization server, an offset factor that quantifies a negative impact of the given digital component on other digital components among the multiple digital components;

optimizing, by the component optimization server, a distribution amount applied to the given digital component based on the offset factor and a baseline distribution amount applied to each of the multiple digital components in each of the configurations of the multiple different configurations, including increasing the distribution amount applied to the given digital component based on a magnitude of the offset factor; and transmitting, by a distribution server, the given digital component to the client device based on the distribution amount applied to the given digital component, including causing the given digital component to be presented at the client device in the particular configuration.

16. The non-transitory computer readable medium of claim 15, wherein optimizing the distribution amount comprises:

for each configuration of the multiple configurations:

calculating, by the component optimization server, a total benefit value based on (i) eligibility values of the multiple digital components that are eligible to be presented within the single digital component slot in the configuration and (ii) placements of the multiple digital components within the single digital component slot in the configuration;

calculating, by the component optimization server, a total benefit value based on (i) eligibility values of the multiple digital components that are eligible to be presented within the single digital component slot in the selected configuration and (ii) placements of the multiple digital components within the single digital component slot in the selected configuration;

calculating, by the component optimization server, a difference between the total benefit value based on the configuration and the total benefit value based on the selected configuration;

calculating, by the component optimization server, a maximum value of a function of (i) a weighted function of a baseline distribution amount applied to each of the digital components in the configuration, (ii) an interaction rate for each of the digital components in the configuration, and (iii) a difference between the total benefit value based on the configuration and the total benefit value based on the selected configuration;

comparing, by the component optimization server, the maximum value of the function for the configuration to the maximum value of the function for each of the other multiple different configurations; and selecting, as the offset factor, a largest value of the function over the multiple different configurations.

17. The non-transitory computer readable medium of claim 16, wherein the weighted function of the baseline distribution amount is weighted using the interaction rates for the digital components in the configuration.

18. The non-transitory computer readable medium of claim 16, wherein calculating the total benefit value based on the configuration comprises summing, over each of the eligible digital components, a function of an eligibility value of the digital component and an interaction rate of the digital component in the configuration.

19. The non-transitory computer readable medium of claim 16, wherein calculating the total benefit value based on the selected configuration comprises summing, over each of the eligible digital components, a function of an eligibility value of the digital component and an interaction rate of the digital component in the selected configuration.

20. The non-transitory computer readable medium of claim 16, wherein the instructions cause the one or more computing devices to perform operations further comprising determining, by the component optimization server, that the offset factor that quantifies a negative impact of the given digital component on other digital components among the multiple digital components is zero when the particular configuration that has the highest configuration score and includes the given digital component also provides the largest value of the function.

* * * * *